United States Patent
Blank et al.

(10) Patent No.: US 6,395,837 B1
(45) Date of Patent: May 28, 2002

(54) ALKYLATED ARYL DISULFONIC ACID CATALYSTS FOR CROSSLINKING POLYETHYLENE

(75) Inventors: Werner J. Blank, Wilton; Edward T. Hessell, Fairfield, both of CT (US); Richard A. Abramshe, Highland, NY (US)

(73) Assignee: KIng Industries, Inc., Norwalk, CT (US)

( * ) Notice: Subject to any disclaimer, the term of this patent is extended or adjusted under 35 U.S.C. 154(b) by 0 days.

(21) Appl. No.: 09/909,239

(22) Filed: Jul. 19, 2001

Related U.S. Application Data
(60) Provisional application No. 60/222,894, filed on Aug. 3, 2000.

(51) Int. Cl.[7] ............................................. C08F 8/00
(52) U.S. Cl. .................. 525/244; 525/246; 525/288; 525/326.5; 525/353
(58) Field of Search ................... 525/244, 246, 525/288, 326.5, 353

(56) References Cited

U.S. PATENT DOCUMENTS

| | | | |
|---|---|---|---|
| 4,160,072 A | 7/1979 | Shinkai et al. | 521/86 |
| 4,252,906 A | 2/1981 | Hosokawa et al. | 521/86 |
| 4,297,310 A | 10/1981 | Akutsu et al. | 264/83 |
| 4,413,066 A | 11/1983 | Isaka et al. | 521/149 |
| 4,446,283 A | 5/1984 | Doi et al. | 525/344 |
| 4,753,992 A | 6/1988 | Umpleby | 535/100 |
| 5,350,812 A | 9/1994 | Sultan et al. | 525/477 |
| 5,393,823 A | 2/1995 | Konno et al. | 524/507 |
| 5,639,825 A | 6/1997 | Nanbu et al. | 525/100 |
| 6,005,055 A | 12/1999 | Dammert et al. | 525/326.5 |

*Primary Examiner*—Bernard Lipman
(74) *Attorney, Agent, or Firm*—Morgan & Finnegan, LLP

(57) ABSTRACT

The present invention is directed to a highly active condensation catalyst suitable for the crosslinking of alkoxysilanyl polyolefins, e.g., silane functional polyethylene, selected from the group consisting of:

(i) an alkylated aryl disulfonic acid selected from the group consisting of stucture I

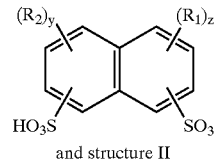

and structure II

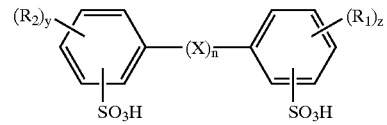

and structure II

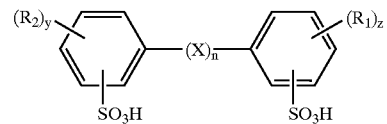

wherein each of $R_1$ and $R_2$ is the same or different and is a linear or branched alkyl group with 6 to 16 carbons, y is 0 to 3, z is 0 to 3 with the proviso that y+z is 1 to 4, X is a divalent moiety selected from the group consisting of —C($R_3$)($R_4$)—, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and —S(O)$_2$—, wherein n is 1;

(ii) a derivative of (i) selected from the group consisting of the anhydrides, esters, epoxy blocked sulfonic acid esters, acetylates, and amine salts thereof which is hydrolyzable to the alkylated aryl disulfonic acid.

31 Claims, No Drawings

ALKYLATED ARYL DISULFONIC ACID CATALYSTS FOR CROSSLINKING POLYETHYLENE

CROSS REFERENCE TO RELATED APPLICATIONS

This is a continuation in part application of provisional application, Ser. No. 60/222,894, filed Aug. 3, 2000. This is co-pending with application entitled: ALKYLARYL AND ARYLALKYL MONOSULFONIC ACID CATALYSTS FOR CROSSLINKING POLYETHYLENE being filed concurrently.

FIELD OF INVENTION

The present invention is directed to a crosslinkable polymer composition comprising an alkoxysilane functional polyolefin and an alkylated aryl disulfonic acid as a crosslinking catalyst. More particularly, the present invention is directed to a silane functional polyolefin and an alkylated aryl disulfonic acid wherein the aryl moiety is naphthalene or biphenyl or two benzene rings covalently bonded through a divalent moiety and wherein the aryl moiety is substituted with 1–4 alkyl groups and each alkyl group is a hydrocarbon chain with 6 to 16 carbons, preferably 9 to 12 carbons with the total number of carbons in the alkyl substituents being in the range of 9 to 64 carbons. The catalysts of the present invention also include derivatives of the alkylated aryl disulfonic acids that can be hydrolyzed to the corresponding acids.

The useful alkylated aryl disulfonic acid catalysts in the present invention are highly active crosslinking catalysts being effective at a very low concentration in the silane functional polyolefin composition. Because of the low concentration of the alkylated aryl disulfonic acid catalyst required, it is anticipated that the electrical resistance of resulting crosslinked polymeric compositions will be excellent. The resulting crosslinked polymeric compositions are desirable for use as coatings for electrical cables and wires.

BACKGROUND OF THE INVENTION

Thermoplastic polyolefins such as polyethylene have long been known as excellent dielectric materials for use as insulation in the manufacture of power cables. The major drawback of thermoplastic polyethylene is the relatively low temperature at which it softens and flows. The upper temperature at which thermoplastic polyethylene is useful is 75° C., which is rather low. This temperature may be increased by crosslinking. However, polyethylene is a linear polymer with no functional groups along the chain for crosslinking. Thus, to crosslink polyethylene, the polymer chain needs to be activated or provided with functional groups. Although polyethylene is described here, the present discussion is applicable generally to polyolefins.

One way to crosslink polyethylene is to incorporate a peroxide crosslinking agent to provide a source of free radicals when heated to a temperature higher than its decomposition temperature. The free radical extracts a hydrogen from the polyethylene backbone to produce alkyl radicals which combine to crosslink the linear polyethylene. However, polyethylene tends to scorch at a low temperature, which limits the temperature at which the polyethylene can be heated to provide crosslinking and to produce an extruded coated wire. For this reason, wires produced by using peroxide to crosslink polyethylene require a specialized extruder equipped with a high pressure continuous vulcanization (CV) tube. However, this extruder is very expensive and costly to operate.

Another way to crosslink polyethylene is to use electron beam irradiation to form free radicals. This process avoids the use of the high pressure continuous vulcanization extruder. However, the use of electron beam radiation prevents the use of carbon black commonly used as a pigment in coated wires. Further, it was found that where a thicker coating material is desired, the thickness of the material prevents penetration by the electron beam leading to non-uniformity of the resulting coating, thereby posing challenging engineering problems. Moreover, the equipment to produce high energy radiation and the necessary special shielding is also very expensive.

A third way of crosslinking polyethylene is to incorporate a second component, an unsaturated silane compound, such as vinyl alkoxysilane into the polyethylene. A small amount of a vinyl alkoxysilane, preferably vinyl trimethoxysilane (VTMS), at a level of 0.5% to 5%, preferably 2%, is incorporated into the backbone of the polyethylene chain and moisture cured.

Suitable unsaturated silanes would be of general structure, $CH_2=CH-Si-(OR)_3$, wherein R is any alkyl group of 1–4 carbons. Examples of unsaturated silane compounds would be vinyltrimethoxysilane, vinyltriethoxysilane, and vinyldimethoxyethoxysilane. The most preferred is vinyltrimethoxysilane (VTMS).

The crosslinking of polyethylene using VTMS is a two step process. The first step involves hydrolysis of the methoxy group to a hydroxy group with the liberation of methanol. The second step is a condensation step to release $H_2O$ to crosslink or cure the polymer. The hydrolysis step requires the presence of water and the catalyst used must not be soluble in water or affected thereby. The rate of cure of silane functionalized polyethylene is controlled by silane concentration, silane structure, catalyst concentration and type, resin crystallinity, coating thickness, the rate at which water penetrates into the inner layers of the polymer, the cure temperature, and the relative humidity.

There are many advantages to this process. It is a single line process. That is, the VTMS modified polyethylene can go directly from the reactor to the extruder without going through grafting and/or compounding. This process also provides a product that is very clean with uniform density and molecular weight distribution.

Methods of incorporating hydrolyzable silane groups into a polyethylene followed by crosslinking of the resulting silane functional polymer are known.

Shinkai et al., U.S. Pat. No. 4,160,072 and Hosokawa et al., U.S. Pat. No. 4,252,906, disclosed zinc carboxylates as the crosslinking catalyst for foamable and crosslinkable silane functional polyethylene.

Akutsu et al., U.S. Pat. No. 4,297,310 disclosed a process for producing moisture crosslinkable polymer by copolymerization of ethylene and an unsaturated silane compound. Metal salts of carboxylic acids, organic bases, inorganic acids and organic acids were disclosed as suitable crosslinking catalysts for this system. Toluene sulfonic acid was among one of the organic acids listed.

Isaka et al., U.S. Pat. No. 4,413,066, described a copolymer of ethylene and an ethylenically unsaturated silane in combination with a crosslinking catalyst. The copolymer may further comprise a monomer copolymerizable with the ethylene and the ethyleneically unsaturated silane compound. The catalysts include metal carboxylate salts, organic bases, inorganic acids and organic acids as the crosslinking catalysts. Although toluene sulfonic acid was disclosed as being a suitable crosslinking catalyst, the preferred catalysts are the carboxylates of tin.

Doi et al., U.S. Pat. No. 4,446,283, described a copolymer consisting essentially of ethylene and a specific unsaturated silane compound having a (meth)acrylate group as a copolymerizable group and a methoxy group as a hydrolyzable group, and an effective amount of a silanol crosslinking catalyst. The catalysts useful for crosslinking are the same as those previously described. Umpleby, U.S. Pat. No. 4,753,992, discloses a crosslinkable composition comprising a silyl polymer and a silanol crosslinking catalyst which is a polymeric tin compound. However, the electro-conductivity of tin or metal salts of the carboxylic acids, and the inorganic acids disclosed by Isaka et al. are relatively high. It is not desirable to incorporate such compounds in a wire coating that should be an insulation material. In addition, the metal carboxylates and inorganic metal salts provide a slower rate of cure than the catalysts useful in the present invention.

Another process for crosslinking polyethylene was described in Konno et al., U.S. Pat. No. 5,393,823. Konno et al. disclosed a paint composition wherein a vinyl polymer is obtained by copolymerizing a vinyl monomer with a siloxy group and a polyisocyanate compound in the presence of a radical generator. The vinyl siloxy monomer with a radical generator and a curing agent are mixed with a siloxy dissociating catalyst. The compounds suitable as the dissociation catalyst include phosphoric acid and its salts, organic phosphates and phosphites. Also included as dissociation catalysts are toluene sulfonic acid, naphthalene disulfonic acid and their amine salts. See also, Nanbu et al., U.S. Pat. No. 5,639,825. However, the use of organic acids such as toluene sulfonic acids and naphthalene disulfonic acid causes discoloration in the polymer produced. Such catalysts are not useful in the present invention because they have a high degree of water solubility and are extracted from the polymeric composition during the moisture curing process.

Recently, Dammert et al., U.S. Pat. No. 6,005,055 disclosed the use of alkylated benzene and naphthalene sulfonic acids as suitable silanol condensation catalysts for crosslinking silane functional polyethylene. The alkylated benzene and naphthalene sulfonic acids are disclosed to have a total of 14 to 28 carbons wherein there are a total number of 4 to 18 carbons, preferably 10 to 18 carbon atoms, in the substituent alkyl groups. In particular, dodecyl benzene sulfonic acid and tetrapropyl benzene sulfonic acid were exemplified. These compounds were compared with p-toluene sulfonic acid to show dramatic improvement in the copolymer produced.

However, it would be desirable to have a catalyst that is more highly active in the presence of moisture to improve the cure rate at ambient temperatures. It is also desirable to have a catalyst that is non-extractable into water and is compatible with the polymer system.

SUMMARY OF THE INVENTION

The present invention provides a crosslinkable polymeric composition comprising a silane functional crosslinkable polyolefin with a crosslinking catalyst selected from the group consisting of an alkylated aryl disulfonic acid and a hydrolyzable derivative thereof. The catalyst is useful at a level of 0.1 mM/g to 1 mM/g in the polymeric composition. The alkylated aryl disulfonic acid catalysts are highly compatible with the polymeric composition. They have low water solubility, are less extractable into water and provides a very fast cure rate at a low concentration. Because the catalysts useful in the present invention are effective at very low concentrations, and are less electro-conductive, the final crosslinked polymer composition are anticipated to have much lower electro-conductivity and are more desirable for use as an insulation material for electical wire coating.

The silanol condensation catalyst useful for crosslinking silane functional polyolefin is selected from the group consisting of:

(i) an alkylated aryl disulfonic acid selected from the group consisting of

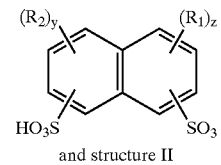

and structure II

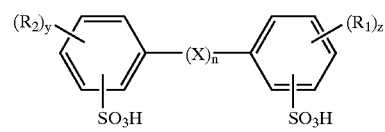

and structure II

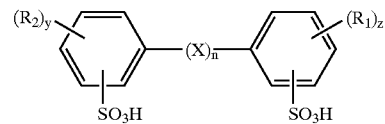

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and —S(O)$_2$—, wherein n is 1; and (ii) a derivative of (i) selected from the group consisting of the anhydrides, esters, epoxy blocked sulfonic acid esters, acetylates, and amine salts thereof which is hydrolyzable to the alkylated aryl disulfonic acid.

Preferably, the aryl group is naphthalene such as in dinonyl naphthalene disulfonic acid. When the aryl disulfonic acid is structure II, preferably n is 0, or X is oxygen and n is 1, or X is S and n is 1 to 3, or X is S(O)$_2$ and n is 1. The derivative of (i) may be an epoxy blocked sulfonic acid wherein one or both of the sulfonic acid groups is reacted with an epoxide to provide mono- or di-beta-hydroxy sulfonic acid ester. Suitable epoxy compounds for preparing an epoxy blocked sulfonic acid include diglycidyl ethers of bisphenol A or bisphenol F; diglycidyl ethers of a glycol, such as ethylene glycol, propylene glycol or butanediol; monoglycidyl ethers of C1 to C18 alpha olefin epoxides and 1,2-epoxycyclohexane.

The invention is further directed to a process for crosslinking silane functional polyolefins by adding an alkylated aryl disulfonic acid or a hydrolyzable derivative thereof as a crosslinking catalyst.

DETAILED DESCRIPTION OF THE INVENTION

The invention is directed to a crosslinkable polyolefin composition comprising a polyolefin with a crosslinkable group consisting of an alkoxysilane and an alkylated aryl disulfonic acid crosslinking catalyst, or a hydrolyzable derivative thereof, wherein the aryl is naphthalene, biphenyl or two benzene rings covalently bonded through a divalent moiety. The alkylated aryl disulfonic acid catalysts useful in the invention have excellent compatibility with the polyolefin, with low water solubility and extractability and provide a very fast cure rate at a low concentration. Because the catalysts are effective at a very low concentration, the resulting crosslinked polymer are anticipated to have lower electro-conductivity and are, therefore, more desirable for use as insulation for electrical wire coatings.

The polyolefin used in the composition depends on the type of technology used to produce the silane functional polymer. For post grafting technology, so called "Sioplas technology" and the "monosil technology", where the grafting and addition of catalyst are all conducted in a single step, almost any polyolefin is acceptable. Examples of suitable polyolefins would be polyethylene, polypropylene, polyisobutylene, or mixtures thereof. Other suitable polymers would be the copolymers of ethylene with at least one of the following alpha-olefin monomers: 1-propene, 1-butene, 1-hexene, 1-octene and styrene. Such copolymers of ethylene with other alpha-olefins are commonly referred to as low density polyethylene (LDPE) and linear low density polyethylene (LLDPE). Also suitable would be copolymers of ethylene with a monomer selected from the following: vinylethers such as vinylmethyl ether, vinylethylether and phenylvinylether; acrylates such as methylacrylate, ethylacrylate, and methylmethacrylate; and vinyl esters such as vinylacetate.

The most preferred polyolefin for post grafting of a silane group thereon is polyethylene. Where an unsaturated silane compound is copolymerized with an olefin to incorporate the silane into the main chain of the polymer backbone, ethylene is the only suitable olefin.

The silanol condensation catalyst useful in the invention is selected from the group consisting of:

(i) an alkylated aryl disulfonic acid selected from the group consisting of

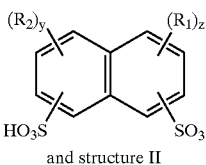

and structure II

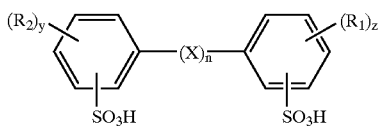

and structure II

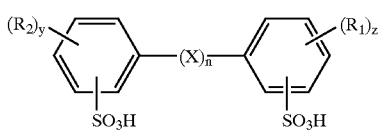

wherein each of $R_1$ and $R_2$ is the same or different and is a linear or branched alkyl group with 6 to 16 carbons, y is 0 to 3, z is 0 to 3 with the proviso that y+z is 1 to 4, n is to 0 to 3, X is a divalent moiety selected from the group consisting of —C($R_3$)($R_4$)—, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and —S(O)$_2$, wherein n is 1; and (ii) a derivative of (i) selected from the group consisting of the anhydrides, esters, epoxy blocked sulfonic acid esters, acetylates, and amine salts thereof which is hydrolyzable to the alkylated aryl disulfonic acid.

Preferably, the aryl group is naphthalene such as in dinonyl naphthalene disulfonic acid. Wherein the aryl disulfonic acid is structure II, preferably the aryl is biphenyl wherein n=0, or aryl is two phenyl rings bonded through a divalent group X and X is oxygen and n is 1, or X is sulfur and n is 1 to 3, or X is S(O)$_2$ and n is 1. The derivative may be an epoxy blocked sulfonic acid wherein one or both of the sulfonic acid groups is reacted with an epoxide to provide a mono- or di-beta-hydroxy sulfonic acid ester. Suitable epoxy compounds for preparing an epoxy blocked sulfonic acid include diglycidyl ethers of bisphenol A or bisphenol F; diglycidyl ethers of a glycol, such as ethylene glycol, propylene glycol or butanediol; monoglycidyl ethers of C1 to C18 alpha olefin epoxides and 1,2-epoxycyclohexane.

The invention is further directed to a process for crosslinking silane functional polyolefins by adding an alkylated aryl disulfonic acid or a hydrolyzable derivative thereof as a crosslinking catalyst.

Although silane crosslinked polyethylene is well known, it is instructive to review the types of polymers, as well as the various processes which can be used to achieve a silane crosslinked polyolefin. The polyolefin used depends on the type of technology used to produce the silane functional polymer. For post grafting technology, so called "Sioplas technology" and the "monosil technology", where the grafting and addition of catalyst are all conducted in a single step, almost any polyolefin is acceptable. Examples of suitable polyolefins would be polyethylene, polypropylene, polyisobutylene, or mixtures thereof. Other suitable polymers would be the copolymers of ethylene with at least one of the following alpha-olefin monomers: 1-propene, 1-butene, 1-hexene, 1-octene and styrene. Such copolymers of ethylene with other alpha-olefins are commonly referred to as low density polyethylene (LDPE) and linear low density polyethylene (LLDPE). Also suitable would be copolymers of ethylene with a monomer selected from the following: vinylethers such as vinylmethyl ether, vinylethylether and phenylvinylether; acrylates such as methylacrylate, ethylacrylate, and methylmethacrylate; and vinyl esters such as vinylacetate.

The most preferred polyolefin for post grafting of a silane group thereon is polyethylene. Where an unsaturated silane compound is copolymerized with an olefin to incorporate the silane into the main chain of the polymer backbone, ethylene is the only suitable olefin. Suitable unsaturated silanes would be of general structure, CH$_2$=CH—Si—(OR)$_3$, wherein R is any alkyl group of 1–4 carbons. Examples of unsaturated silane compounds would be vinyltrimethoxysilane, vinyltriethoxysilane, and vinyldimethoxyethoxysilane. The most preferred is vinyltrimethoxysilane (VTMS). The catalysts of the invention are useful in each of the methods because they are highly reactive and are effective in the presence of moisture.

There are three basic methods for producing a silane crosslinked polyolefin. The most commonly used silane is an ethylenically unsaturated silane, vinyltrimethoxysilane (VTMS). The first method involves the free radical promoted grafting of the alkoxysilane containing an unsaturated group onto a polyolefin to give a trialkoxysilane graft polyolefin. A free radical initiator is required to promote grafting. In a second step, a mixture of a crosslinking catalyst and other additives and pigments (referred to as the master batch), is combined with the siloxy polyethylene in an extruder at high temperature. The resulting polymer is cured, i.e. crosslinked, in a high humidity environment at a slightly elevated temperature over a period of several hours to several days. This process is commonly referred to the Sioplas process.

In a second method, the olefin is copolymerized with a small amount of a vinyl containing alkoxysilane to give a slightly different type of silane modified polyolefin than would be obtained by the grafting technique described above. The most commonly used is an unsaturated silane compound, also VTMS. In this case, VTMS is incorporated into the main chain of the polymer backbone and places the alkoxysilane groups in closer proximity to the polyolefin backbone than in the corresponding silane graft polymer. Incorporation of the alkoxysilane groups during olefin polymerization supposedly results in a more thermally stable polymer than a polymer using silane graft polyolefin. In a second step, the alkoxysilane functionalized polyolefin is crosslinked by the use of a catalyst incorporated as one component in a master batch. See U.S. Pat. No. 4,297,310.

A third method for producing a silane crosslinked polyolefin is a single step process whereby a polyolefin, VTMS, a free radical initiator, and the crosslinking catalyst are combined in an extruder at a specified temperature. In this case the grafting of the silane and the addition of the crosslinking catalyst occur in a single step. This process is commonly referred to as the "monosil" process.

The master batch accounts for about 5 wt % of the polymer composition and may include other additives such as antioxidants and pigments. The amount of catalyst present in the master batch will depend on the activity and molecular weight (MW) of the catalyst as well as the compatibility of the catalyst with the polymer.

It is important to note that the percentage of alkoxysilane incorporated into the polyolefin either through grafting or copolymerization is relatively small. Typically, the level of the silane crosslinking group is between 0.5 and 5 wt % with a preferred level of about 2 wt %. It is important to keep the relatively polar trialkoxysilane groups incorporated at a low level so that it does not significantly alter the nonpolar nature of the polyolefin. It should be noted that the siloxy polyolefins of the invention are very nonpolar. This restricts the type of crosslinking catalyst that can be used because the catalyst must possess good compatibility with the polyolefin in order to function properly.

The catalyst that provides improved compatibility with polyethylene and increased catalytic activity is an alkylated aryl disulfonic acid selected from the group consisting of structure I

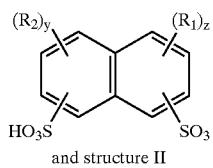

and structure II

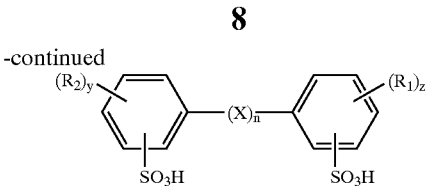

and structure II

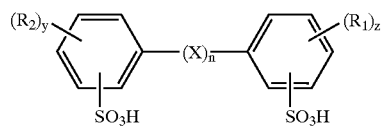

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and —S(O)$_2$—, wherein n is 1; and (ii) a derivative of (i) selected from the group consisting of the anhydrides, esters, epoxy blocked sulfonic acid esters, acetylates, and amine salts thereof which is hydrolyzable to the alkylated aryl disulfonic acid.

The preferred number of alkyl groups on the aryl moiety will depend on their size and degree of branching. For naphthalene disulfonic acids or the derivatives thereof, the total number of carbons is in the range of 12–64, with the individual alkyl groups having 6–16 carbons, preferable 9–12 carbons. In a preferred embodiment of the invention, the catalyst is dinonylnaphthalene disulfonic acid. Examples of compounds of structure II include the alkylated disulfonic acids of diphenylmethane, 2,2-diphenylpropane, diphenyl ketone, diphenylether, diphenyl sulfide and diphenylsulfone. The alkylated biphenyl disulfonic acids wherein n=0 are preferred. The preferred size of the individual alkyl groups for compounds of structure II is from about 6 to about 16 carbons with a most preferred range of from about 9 to about 12 carbons. The preferred total number of carbons in the alkyl groups is in the range of 25–50.

The crosslinking catalysts of the present invention include derivatives of the alkylated aryl disulfonic acids, which can be converted under conditions of curing to the free sulfonic acid. Examples of such derivatives include disulfonic acid anhydrides, alkyl disulfonic acid esters, epoxy blocked sulfonic acids, acetylated disulfonic acids, and amine salts of the alkyl aryl disulfonic acids.

The derivatives of the sulfonic acid crosslinking catalysts of the present invention may be prepared from the sulfonic acid in accordance with procedures well known in the art. The process for making an ester or an acetylates typically involves condensation of the sulfonic acid group with a hydroxy functioning group such as an alcohol, or an acetyl alcohol. The anhydride of a sulfonic acid is prepared by heating a sulfonic acid compound to remove $H_2O$ causing two sulfonic acid groups to condense to form an anhydride. The epoxy blocked esters are prepared from reacting the sulfonic acid with an epoxy compound. The metal salt of the alkylated naphthylene monosulfonic acid or the arylalkyl sulfonic acid can be prepared from the corresponding sulfonic acid using well known procedures. The process typically involves reaction of the corresponding sulfonic acid with a metal oxide or metal hydroxide in a suitable solvent such as methanol. The amine salt is prepared by reacting ammonia or an alcohol amine with the sulfonic acid group.

Preparation of Alkylated Aryl Disulfonic Acids

The alkylated aryl disulfonic acid catalysts of structure I or structure II may be prepared by methods known to those skilled in the art. Generally, the process involves alkylation of the aryl moiety followed by sulfonation. For the compounds of structure I, the starting aromatic compound is naphthalene. For the compounds of structure II, the starting aromatic compound is biphenyl or a diphenyl substituted alkylene, carbonyl, sulfide, disulfide, polysulfide, sulfone or oxide. Examples of the starting aromatic compound for structure II include biphenyl, diphenyl methane, 2,2,-diphenylpropane, diphenyl ketone, diphenylether, diphenyl sulfide diphenylsulfone. Suitable methods for alkylation commonly involve the reaction of the aryl moiety with an olefin, alcohol, alkylhalide, or other alkylating agent in the presence of a catalyst. Although many different types of alkylating agents are known, the preferred alkylating agent is an olefin.

Suitable catalysts for the alkylation of aryl moieties are Lewis acid or super acid catalysts known in the art. Lewis acid catalysts such as boron trifluoride, iron trichloride, tin tetrachloride, zinc dichloride or antimony pentafluoride may be used. Acidic clays, silica, or alumina may also be used. For example, the processes described in Hans Dressler, et. al., U.S. Pat. No. 4,604,491 and Yoshida, et. al., U.S. Pat. No. 4,714,794 may be employed. Hans Dressler, et. al., U.S. Pat. No. 4,604,491 discloses the alkylation of naphthalene with an olefin in the presence of an activated silica alumina clay. Yoshida, et. al., U.S. Pat. No. 4,714,794 discloses the alkylation of naphthalene with an olefin using activated clay. In addition, Ho et al., U.S. Pat. No. 5,602,086 discloses the use of super acid catalysts such as trifluoromethane sulfonic acid, hydrofluoric acid or trifluoromethylbenzene sulfonic acids. Another commonly used class of catalysts are the acidic zeolite catalysts (See Ashjian, et al., U.S. Pat. No. 5,034,563; Angevine et al., U.S. Pat. No. 5,001,296; Kuehl et al., U.S. Pat. No. 5,401,896). Examples of such catalysts are Zeolite Beta, Zeolite Y, ZSM-5, ZSM-35 and USY.

One preferred method is the alkylation of the aryl moiety with an olefin using aluminum chloride as catalyst. In some instances, a co-catalyst such as nitromethane or nitrobenzene is also used to promote the reaction. Such methods are disclosed in King, et. al., U.S. Pat. No. 2,764,548 and Ho et al., U.S. Pat. No. 5,254,274.

The resulting intermediate alkylated aryl compound can then be sulfonated by means known in the art. Sulfonation is typically conducted by reacting the alkylated aryl compound with a sulfonating agent such as fuming sulfuric acid (oleum), sulfur trioxide or chlorosulfonic acid. The mole ratio of alkylated aryl compound to the sulfonating agent is adjusted accordingly to provide the disulfonic acid as the preferred product. Examples of procedures for sulfonation are found in Jerry March, *Advanced Organic Chemistry, Reactions, Mechanisms and Structure*, 4$^{th}$ edition, John Wiley and Sons, p.528, 1992. Typically about 1.8 to 2.2 moles of the sulfonating agent is added per mole of the aromatic compound in a hydrocarbon solvent. Once the sulfonation reaction is complete, the residual sulfuric acid is removed and the hydrocarbon layer is washed with water to remove the water-soluble impurities.

The following nonrestrictive examples are provided to further illustrate the invention.

EXAMPLE 1

Dinonylnaphthalene Disulfonic Acid

Dinonylnaphthalene disulfonic acid is prepared using the method described above. The product is also available commercially as an approximately 55% actives solution in iso-butanol (NACURE® 155, King Industries, Norwalk, Conn.).

Comparative Example 1

Dodecyl Benzene Sulfonic Acid

Dodecyl benzene sulfonic acid (DDBSA) was purchased from Aldrich Chemical Company and used without further purification.

EXAMPLE 2

Crosslinking Studies

The dinonylnaphthalene disulfonic acid of Example 1 and the DDBSA of comparative Example 1 were evaluated for crosslinking of polyethylene in wire insulation. The catalysts were incorporated into master batches at equal molar concentrations and then the master batches were blended with silane functionalized polyethylene and extruded onto 14 gauge wire. The details of incorporating the catalysts into the polymer and extrusion onto the wire is described below.

Master Batching

Dinonylnaphthalene disulfonic acid of Example 1 and dodecylbenzene sulfonic acid of Comparative Example 1 were compounded into unfunctionalized low density polyethylene (LDPE) with a melt index of 0.66 at 110° C. using equipment and procedures known to those skilled in the art. Each catalyst and LDPE were dry blended by hand prior to compounding. Compounding was conducted on a 1100 gram capacity Branbury Mixer Compounder at 100° C. for 7 minutes. The weight percent of the catalyst in each master batch was adjusted to deliver an equal molar concentration of the respective catalyst to the final wire coating.

The compounded master batch was converted to a form suitable for dry mixing with the silane functional polyethylene (XLPE). This was achieved through several physical processes. First the hot compounded master batch was converted to ¼" thick sheets by a roll mill having heated rolls set at 70° C. The sheets were immediately cut into 3" strips after emerging from the roll mill. The strips were then allowed to cool to room temperature and then chopped into ¼" square pieces to match the particle sizes of XLPE, which in this case was nominally ¼" in diameter. It is important that the master batch and XLPE pellet size and weight are similar so that concentration gradients do not develop upon settling after dry blending.

Extrusion OF Polymer onto Wire

Each master batch was dry blended with the silane functional XLPE resin (AT-910, from AT Plastics, melt index=0.66) at 10 wt % prior to extrusion. The blended plastic was extruded onto 14 gauge copper wire using a Davis extruder having 4 heating zones (140° C., 150° C., 160° C., and 170° C.) and a screw with a 20:1 length to diameter ratio set at a speed of 15 rpm. The die was chosen to give an average coating wall thickness of 30 microns. About 100 ft of wire was extruded for each catalyst sample. In between each sample run about 100 ft. of wire was extruded from XLPE resin alone (no catalyst) to clean the extruder for the next sample. A control sample (containing no catalyst) was run first to eliminate the possibility of contamination. The wire from each run was immediately coiled and placed in individual large zip-lock bags which were then placed in a cooler with dry ice to prevent cure during long term storage.

Curing and Evaluation of Degree of Crosslinking

The extent of crosslinking was measured by the ICEA T-28562 Hot Creep Test. In this test, sections of the finished wire samples for each catalyst, along with sections of the control (no catalyst), were cured under the following conditions:

1. 30° C. and 30% RH (Table 1)
2. 50° C. and 100% RH (Table 2)

Three 3-inch specimens of the insulation are stripped from each twelve inch section of wire at various intervals of 1 day, 3 days, 4 days and 7 days. A special wire stripper was used so that the insulation would not be deformed or pre-stressed prior to testing.

In the center of each 3-inch strip, a 1-inch section was marked with two lines with a permanent marker. Each of the strips was tested for "hot creep" to determine when the polymer was sufficiently crosslinked, and then tested for "hot set" if there was sufficient crosslinking.

The "hot creep" was conducted by suspending each sample strip at the top end from a stand in an oven at 150° C. with a weight of 119 g. attached to the bottom end. The weight used was determined based on the cross-sectional area of the wire coating and was calculated using the equations specified in the ICEA T-28562 test procedure. The strips were left in an oven for 15 minutes. A sample strip was deemed crosslinked, if it survived the 15 minute period in the oven without breaking. A sample strip that was not crosslinked broke within 2 minutes at 150° C. This is reported as "hot creep".

If the sample strip did not break after 15 minutes, the weight was removed and the strip was left for an additional 5 minutes in the oven. The strip was then removed from the oven and allowed to cool to room temperature. The percent change in length of the cooled sample is reported as the "hot set". It should be noted that the statistical error in the hot set measurement is ±5%.

Table 1 shows the results of "hot creep" and "hot set" for curing conditions at 30° C. and 30% relative humidity and Table 2 shows the results of "hot creep" and "hot set" for curing conditions at 50° C. and 100% relative humidity of each group of the 3 strips using Example 1 and Comparative Example 1 as the catalyst. The fraction reported for "hot creep" in each of the tables represents the number of samples out of the three tested that passed the crosslinking test. Where the "hot creep" test showed that the polymer was sufficiently cured (crosslinked) then "hot set" test was conducted and the the percent creep presented in the lower section of each table.

The results in Tables 1 and 2 show that the wire insulation containing the catalyst of Example 1 provided a faster rate of cure at a very low concentration both at ambient temperature and low humidity, as well as high temperature and high humidity. The wire insulation produced with no catalyst did not cure under any conditions. The wire produced using DDBSA, Comparative Example 1, as the crosslinking catalyst at a comparable molar concentration to that of Example 1 also did not cure at either curing conditions. ND means that the value was not determined since crosslinking failed to take place.

TABLE 1

"Hot Creep" and "Hot Set" Testing at 30° F. and 30% Relative Humidity

| Catalyst | Conc.(mM/g) | Day 1 | Day 3 | Day 4 | Day 7 |
|---|---|---|---|---|---|
| Hot Creep | | | | | |
| None | 0 | 0/3 | 0/3 | 0/3 | 0/3 |
| Example 1 | $0.4 \times 10^{-3}$ | 0/3 | 3/3 | 3/3 | 3/3 |
| DDBSA | $0.4 \times 10^{-3}$ | 0/3 | 0/3 | 0/3 | 0/3 |

TABLE 1-continued

"Hot Creep" and "Hot Set" Testing at 30° F. and 30% Relative Humidity

| Catalyst | Conc.(mM/g) | Day 1 | Day 3 | Day 4 | Day 7 |
|---|---|---|---|---|---|
| Hot Set | | | | | |
| None | 0 | ND | ND | ND | ND |
| Example 1 | $0.4 \times 10^{-3}$ | ND | 0% | 0% | 0% |
| DDBSA | $0.4 \times 10^{-3}$ | ND | ND | ND | ND |

TABLE 2

"Hot Creep" and "Hot Set" Testing at 50° F. and 100% Relative Humidity

| Catalyst | Conc.(mM/g) | Day 1 | Day 2 | Day 3 | Day 7 |
|---|---|---|---|---|---|
| Hot Creep | | | | | |
| None | 0 | 0/3 | 0/3 | 0/3 | 0/3 |
| Example 1 | $0.4 \times 10^{-3}$ | 3/3 | 3/3 | 3/3 | 3/3 |
| DDBSA | $0.4 \times 10^{-3}$ | 0/3 | 0/3 | 0/3 | 0/3 |
| Hot Set | | | | | |
| None | 0 | ND | ND | ND | ND |
| Example 1 | $0.4 \times 10^{-3}$ | 0% | 0% | 0% | 0% |
| DDBSA | $0.4 \times 10^{-3}$ | ND | ND | ND | ND |

The above examples are provided to illustrate the invention and are not to be applied to limit the scope of the invention.

We claim:

1. A crosslinkable polyolefin composition comprising an polyolefin modified with hydrolyzable alkoxysilane groups and a silanol crosslinking catalyst selected from the group consisting of:

(i) an alkylated aryl disulfonic acid selected from the group consisting of

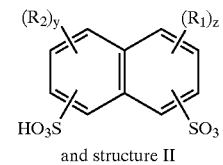

and structure II

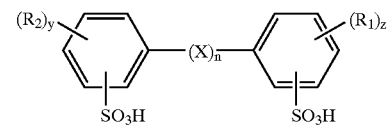

and structure II

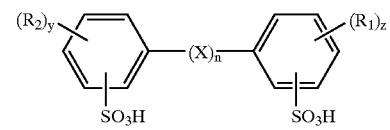

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —$C(R_3)(R_4)$—, wherein each of $R_3$ and $R_4$ is H or independently a linear or branched alkyl group of 1–4 carbons and n is 1; —$C(=O)$—, wherein n is 1; —O— wherein n is 1; —S—, wherein n is 1 to 3; and —S(O)$_2$—, wherein n is 1; and (ii) a derivative of (i) selected from the group consisting of the anhydrides, esters, epoxy blocked sulfonic acid esters, acetylates, and amine salts thereof which is hydrolyzable to the alkylated aryl disulfonic acid.

2. A composition according to claim 1 wherein the polyolefin is polyethylene.

3. A composition according to claim 1 or 2 wherein the silanol crosslinking catalysts is an alkylated aryl disulfonic acid of structure I

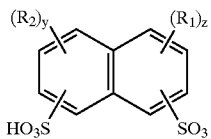

wherein each of $R_1$ and $R_2$ is the same or different and is a linear or branched alkyl with 6 to 16 carbons, y is 0 to 3, z is 0 to 3 with the proviso that y+z is 1 to 4.

4. A composition according to claim 3 wherein each of $R_1$ and $R_2$ is the same or different and is a linear or branched alkyl with 9 to 12 carbons, y is 0 to 3, z is 0 to 3 with the proviso that y+z is 1 to 4.

5. A composition according to claim 4 wherein $R_1$=$R_2$ and is a linear or branched alkyl with 9 to 12 carbons, and y is 1 and z is 1.

6. A composition according to claim 5 wherein $R_1$=$R_2$ and is a linear alkyl with 9 carbons and y is 1 and z is 1.

7. A composition according to claim 1 or 2 wherein the silanol crosslinking catalyst is an alkylated aryl disulfonic acid of structure II

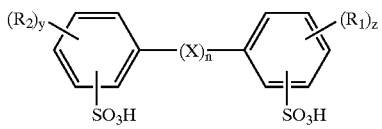

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and —S(O)$_2$—, wherein n is 1.

8. A composition according to claim 7 wherein each of $R_1$ and $R_2$ is the same or different and is an alkyl with 9 to 12 carbons, y is 0 to 3, z is 0 to 3 with the proviso that y+z is 1 to 4, n is 0 to 3, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and —S(O)$_2$—, wherein n is 1.

9. A composition according to claim 7 wherein n is 0.

10. A composition according to claim 8 wherein n is 0.

11. A composition according to claim 8 wherein X is a divalent moiety selected from the group consisting of —C($R_3$)($R_4$)—, —C(=O)—, and —O— and n is 1.

12. A composition according to claim 8 wherein X is a divalent moiety is —S— and n is 3.

13. A composition according to claim 11 wherein X is —C($R_3$)($R_4$)— selected from the group consisting of methylene, and dimethylmethylene.

14. A composition according to claim 11 wherein X is —O—.

15. A composition according to claim 11 wherein X is —C(=O)—.

16. A process for crosslinking polyolefin modified with hydrolyzable alkoxysilane groups in the presence of moisture employing a silanol condensation catalyst selected from the group consisting of:

(i) an alkylated aryl disulfonic acid selected from the group consisting of

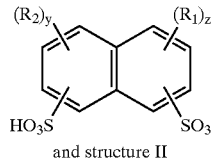

and structure II

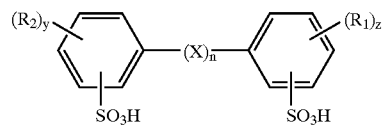

and structure II

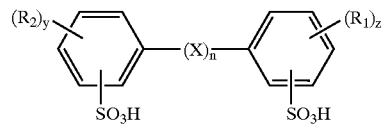

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and —S(O)$_2$—, wherein n is 1; and (ii) a derivative of (i) selected from the group consisting of the anhydrides, esters, epoxy blocked sulfonic acid esters, acetylates, and amine salts thereof which is hydrolyzable to the alkylated aryl disulfonic acid;

wherein the process steps comprise:

forming a master batch of the silanol crosslinking catalyst with polyethylene;

mixing the master batch with an alkoxysilane functional polyolefin to form a mixture at a concentration of 0.1 to 1.0 mM/g of the silanol crosslinking catalyst in the mixture;

heating and extruding the mixture as a coating onto a wire; and curing the extruded coating at a temperature of 25° C. to 50° C. at a relative humidity of 25% to 100%.

17. The process of claim 16 wherein the polyolefin is polyethylene.

18. The process of claim 17 wherein the concentration of the silanol crosslinking catalyst is 0.4 mM/g.

19. The process of claim 16, 17 or 18 wherein the silanol crosslinkingcatalyst is an alkylated aryl disulfonic acid of structure I

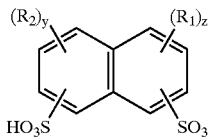

wherein each of $R_1$ and $R_2$ is the same or different and is a linear or branched alkyl with 6 to 16 carbons, y is 0 to 3, z is 0 to 3 with the proviso that y+z is 1 to 4.

20. A process according to claim 19 wherein the silanol crosslinking catalyst is structure I and each of $R_1$ and $R_2$ is the same or different and is a linear or branched alkyl with 9 to 12 carbons, y is 0 to 3, z is 0 to 3 with the proviso that y+z is 1 to 4.

21. A process according to claim 20 wherein the silanol crosslinking catalyst is structure I and $R_1$ and $R_2$ is the same and is a linear alkyl with 9 to 12 carbons, and y is 1 and z is 1.

22. A process according to claim 21 wherein the silanol crosslinking catalyst is structure I and $R_1=R_2$ and is an alkyl with 9 carbons and y is 1 and z is 1.

23. A process according to claim 16, 17 or 18 wherein the silanol crosslinking catalyst is an alkylated aryl disulfonic acid of structure II

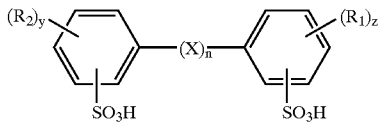

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and S(O)$_2$, wherein n is 1.

24. A process according to claim 23 wherein the silanol crosslinking catalysts is structure II and each of $R_1$ and $R_2$ is the same or different and is a linear or branched alkyl with 9 to 12 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1–4 carbons and n is 1; —C(=O)—, wherein n is 1; —O— wherein n is 1; —S—, wherein n is 1 to 3; and —S(O)$_2$—, wherein n is 1.

25. A process according to claim 23 wherein the silanol crosslinking catalyst is structure II and each of $R_1$ and $R_2$ is the same or different and is a linear or branched alkyl with 6 to 16 carbons, y is 0 to 3, z is 0 to 3 with the proviso that y+z is 1 to 4 and n is 0.

26. A process according to claim 24 wherein the silanol crosslinking catalyst is structure II and each of $R_1$ and $R_2$ is the same or different and is a linear or branched alkyl with 9 to 12 carbons, y is 0 to 3, z is 0 to 3 with the proviso that y+z is 1 to 4 and n is 0.

27. A process according to claim 23 wherein the silanol crosslinking catalyst is structure II and each of $R_1$ and $R_2$ is the same or different and is a linear or branched alkyl with 6 to 16 carbons, y is 0 to 3, z is 0 to 3 with the proviso that y+z is 1 to 4 and X is a divalent moiety X is a divalent moiety selected from the group consisting of —C($R_3$)($R_4$)—, —C(=O)—, and —O— and n is 1.

28. A process according to claim 24 wherein the silanol crosslinking catalyst is structure II and each of $R_1$ and $R_2$ is the same or different and is a linear or branched alkyl with 6 to 16 carbons, y is 0 to 3, z is 0 to 3 with the proviso that y+z is 1 to 4 and X is a divalent moiety —S—, wherein n is 3.

29. A process according to claim 27 wherein the silanol crosslinking catalyst is structure II and each of $R_1$ and $R_2$ is the same or different and is a linear or branched alkyl with 6 to 16 carbons, y is 0 to 3, z is 0 to 3 with the proviso that y+z is 1 to 4 and X is —C($R_3$)($R_4$)— selected from the group consisting of methylene, and dimethylmethylene.

30. A process according to claim 27 wherein the silanol crosslinking catalyst is structure II and each of $R_1$ and $R_2$ is the same or different and is a linear or branched alkyl with 6 to 16 carbons, y is 0 to 3, z is 0 to 3 with the proviso that y+z is 1 to 4 and X is —O—.

31. A process according to claim 27 wherein the silanol crosslinking catalyst is structure II and each of $R_1$ and $R_2$ is the same or different and is a linear or branched alkyl with 6 to 16 carbons, y is 0 to 3, z is 0 to 3 with the proviso that y+z is 1 to 4 and X is —C(=O)—.

* * * * *